United States Patent
Moir et al.

(10) Patent No.: US 7,685,583 B2
(45) Date of Patent: Mar. 23, 2010

(54) OBSTRUCTION-FREE MECHANISM FOR ATOMIC UPDATE OF MULTIPLE NON-CONTIGUOUS LOCATIONS IN SHARED MEMORY

(75) Inventors: Mark S. Moir, Somerville, MA (US); Victor M. Luchangco, Arlington, MA (US); Maurice Herlihy, Brookline, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1492 days.

(21) Appl. No.: 10/620,747

(22) Filed: Jul. 16, 2003

(65) Prior Publication Data
US 2004/0034673 A1 Feb. 19, 2004

Related U.S. Application Data

(60) Provisional application No. 60/396,152, filed on Jul. 16, 2002.

(51) Int. Cl.
*G06F 9/44* (2006.01)
*G06F 9/45* (2006.01)
*G06F 17/00* (2006.01)

(52) U.S. Cl. .................... 717/153; 717/127; 717/149; 707/8; 707/9

(58) Field of Classification Search .......... 717/120; 707/101; 710/200
See application file for complete search history.

(56) References Cited

U.S. PATENT DOCUMENTS

| | | | |
|---|---|---|---|
| 4,584,640 A | 4/1986 | MacGregor et al. | |
| 4,847,754 A | 7/1989 | Obermarck et al. | |
| 5,224,215 A | 6/1993 | Disbrow | |
| 5,319,778 A | 6/1994 | Catino | |
| 5,428,761 A | 6/1995 | Herlihy et al. | |
| 5,918,248 A * | 6/1999 | Newell et al. ............ | 711/147 |
| 6,112,222 A * | 8/2000 | Govindaraju et al. ...... | 718/102 |
| 6,128,710 A | 10/2000 | Greenspan et al. | |
| 6,144,965 A | 11/2000 | Olivier | |
| 6,173,373 B1 * | 1/2001 | Bonola ..................... | 711/147 |
| 6,178,423 B1 | 1/2001 | Douceur et al. | |

(Continued)

FOREIGN PATENT DOCUMENTS

EP 0 366 585 5/1990

(Continued)

OTHER PUBLICATIONS

"Non-Blocking Algorithms and Preemption-Safe Locking on Multiprogrammed Shared Memory Multiprocessors", Maged et al., Mar. 1997.*

(Continued)

*Primary Examiner*—Tuan Q Dam
*Assistant Examiner*—Isaac T Tecklu
(74) *Attorney, Agent, or Firm*—Robert C. Kowert; Meyertons, Hood, Kivlin, Kowert & Goetzel, P.C.

(57) ABSTRACT

We present a technique for implementing obstruction-free atomic multi-target transactions that target special "transactionable" locations in shared memory. A programming interface for using operations based on these transactions can be structured in several ways, including as n-word compare-and-swap (NCAS) operations or as atomic sequences of single-word loads and stores (e.g., as transactional memory).

54 Claims, 3 Drawing Sheets

U.S. PATENT DOCUMENTS

| | | | |
|---|---|---|---|
| 6,182,186 B1* | 1/2001 | Daynes | 710/200 |
| 6,314,563 B1* | 11/2001 | Agesen et al. | 717/108 |
| 6,360,219 B1 | 3/2002 | Bretl et al. | |
| 6,360,220 B1 | 3/2002 | Forin | |
| 6,366,932 B1 | 4/2002 | Christenson | |
| 6,581,063 B1 | 6/2003 | Kirkman | |
| 6,651,146 B1* | 11/2003 | Srinivas et al. | 711/150 |
| 6,799,236 B1* | 9/2004 | Dice et al. | 710/200 |
| 6,826,757 B2 | 11/2004 | Steele, Jr. et al. | |
| 7,017,160 B2* | 3/2006 | Martin et al. | 719/315 |
| 7,117,502 B1* | 10/2006 | Harris | 719/315 |
| 7,246,182 B2* | 7/2007 | Forin et al. | 710/54 |
| 7,293,143 B1* | 11/2007 | Shavit et al. | 711/147 |
| 2001/0047361 A1 | 11/2001 | Martin et al. | |
| 2001/0056420 A1* | 12/2001 | Steele et al. | 707/8 |
| 2003/0140085 A1 | 7/2003 | Moir et al. | |
| 2003/0174572 A1* | 9/2003 | Moir et al. | 365/230.03 |
| 2003/0182462 A1 | 9/2003 | Moir et al. | |
| 2003/0182465 A1 | 9/2003 | Moir et al. | |
| 2003/0200457 A1* | 10/2003 | Auslander et al. | 713/200 |
| 2004/0015510 A1 | 1/2004 | Moir et al. | |
| 2004/0015642 A1 | 1/2004 | Moir et al. | |
| 2004/0153687 A1 | 8/2004 | Moir et al. | |
| 2005/0066082 A1* | 3/2005 | Forin et al. | 710/52 |
| 2006/0161737 A1* | 7/2006 | Martin et al. | 711/147 |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Afek, Yehuda, "Atomic Snapshots of Shared Memory," Journal of the ACM, vol. 40, No. 4, pp. 873-890, 1993.

Agesen, Ole at el., "An Efficient Meta-Lock for Implementing Ubiquitous Synchronization," ACM SIGPLAN Notices, vol. 34, No. 10, pp. 207-222, Oct. 1999.

Anderson, James H. et al., "Universal Constructions for Large Objects," IEEE Transactions on Parallel and Distributed Systems, vol. 10, No. 12, pp. 1317-1332, 1999.

Mellor-Crummey, J., et al., Algorithms for Scalable Synchronization on Shared-Memory Multiprocessors, ACM Transactions on Computer Systems, vol. 9, No. 1, pp. 21-65, Feb. 1991.

Prakash, Sundeep et al., "Non-Blocking Algorithms for Concurrent Data Structures," Technical Report 91-002, University of Florida, Jul. 1, 1991 [Url: http://citeseer.ist.psu.edu/prakash91nonblocking.html].

Prakash, Sundeep et al., "A Nonblocking Algorithm for Shared Queues Using Compare-and-Swap," IEEE Transactions on Computers, vol. 43, No. 5, pp. 548-559. May 1994.

Shann, Chien-Hua et al., "A Practical Nonblocking Queue Algorithm Using Compare-and Swap," Proceedings of the Seventh International Conference on Parallel and Distributed Systems p. 470, IEEE Computer Society, Washington, D.C., 2000.

Shavit, N., et al., "Elimination Trees and the Construction of Pools and Stacks," Theory of Computing Systems, vol. 30, pp. 645-670, 1997.

Stone, Janice M., "A simple and correct shared-queue algorithm using Compare-and-Swap," Proceedings of the 1990 ACM/IEEE Conference on Supercomputing, pp. 495-504, IEEE Computer Society, New York, NY, 1990.

Valois, John D., "Lock-Free Linked Lists Using Compare-and-Swap," Proceedings of the Fourteenth ACM Symposium on Principles of Distributed Computing, pp. 214-222, ACM Press, New York, NY 1995.

U.S. Appl. No. 09/547,288, filed Apr. 11, 2000 and naming as inventor(s) Shavit et al.

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlefs et al.

Afek, Yehuda et al., "Long-Lived Renaming Made Adaptive", 18th Annual ACM Symposium on Principles of Distributed Computing, pp. 91-104, 1999.

Afek, Yehuda, "Wait-Free Made Fast", 27th Annual ACM Symposium on Theory of Computing, pp. 538-547, 1995.

Agesen, Ole et al., "DCAS-Based Concurrent Deques", 12th Annual ACM Symposium on Parallel Algorithms and Architectures, pp. 137-146, Jul. 2000.

Anderson, James H. et al., "Using Local-Spin k-Exclusion Algorithms to Improve Wait-Free Object Implementations", 12th Annual ACM Symposium on Principles of Distributed Computing, Nov. 1995 (revised 1996, 1997).

Arora, Nimar S. et al., "Thread Scheduling for Multiprogrammed Multiprocessors", 10th Annual ACM Symposium on Parallel Algorithms and Architectures, pp. 119-129, 1998.

Attiya, Hagit et al., "An Adaptive Collect Algorithm with Applications", Dept. of Computing Science, The Technion, Israel, May 10, 2001.

Barnes, Greg, "A Method for Implementing Lock-Free Shared Data Structures", 5th Annual ACM Symposium on Parallel Algorithms and Architectures, pp. 261-270, 1993.

Bayer, R. et al., "Concurrency of Operations on B-Trees", Acta Informatica, 1977.

Detlefs, David L. et al., "Even Better DCAS-Based Concurrent Deques", 14th International Conference on Distributed Computing, pp. 59-73, 2000.

Detlefs, David L. et al., "Lock-Free Reference Counting", 20th Annual ACM Symposium on Principles of Distributed Computing, pp. 190-199, 2001.

Dice, David et al., "Mostly Lock-Free Malloc", ACM 2002.ACM SIGPLAN International Symposium on Memory Management, Jun. 2002.

Greenwald, Michael B., "Non-Blocking Synchronization and System Design", PhD Thesis, Stanford University Technical Report STAN-CS-TR-1624, Palo Alto, California, Aug. 1999.

Herlihy, Maurice, "A Methodology for Implementing Highly Concurrent Data Objects", ACM Transactions on Programming Languages and System, pp. 745-770, Nov. 1993.

Herlihy, Maurice, "Dynamic-Sized Lockfree Data Structures", Sun Microsystems Technical Report SMLI TR-2002-112, Jun. 2002.

Herlihy, Maurice et al., "Linearizability: A Correctness Condition for Concurrent Objects", ACM Transactions on Programming Languages and Systems, pp. 463-492, Jul. 1990.

Herlihy, Maurice et al., "The Repeat Offender Problem: A Mechanism for Supporting Dynamic-Sized Lock-Free Data Structures", Sun Microsystems Technical Report SMLI TR-2002-112, Jun. 2002.

Herlihy, Maurice et al., "Transactional Memory: Architectural Support for Lock-Free Data Structures", 20th International Symposium in Computer Architecture, 1993.

Herlihy, Maurice et al., "Obstruction-Free Synchronization: Double-Ended Queues as an Example", 23rd International Conference on Distributed Computing, May 2003.

Israeli, Amos et al., "Disjoint-Access-Parallel Implementations of Strong Shared Memory Primitives", 13th Annual ACM Symposium on Principles of Distributed Computing, pp. 151-160, 1994.

Lamport, Leslie, "How to Make a Multiprocessor Computer that Correctly Executes Multiprocess Programs", IEEE Transactions on Computers, Sep. 1979.

Luchangco, Victor et al., "Nonblocking k-compare-single-swap", 15th Annual ACM Symposium on Parallel Algorithms and Architectures, Jun. 2003.

Martin, Paul et al., "DCAS-Based Concurrent Deques Supporting Bulk Allocation", Sun Microsystems, Inc. Technical Report SMI TR-2002-111, Oct. 2002.

Michael, Maged M. et al., "*Non-Blocking Algorithms and Preemption-Safe Locking on Multiprogrammed Shared Memory Multiprocessors*", Journal of Parallel and Distributed Computing, Mar. 1997.

Michael, Maged M. et al., "*Simple, Fast and Practical Non-Blocking and Blocking Concurrent Queue Algorithms*", 15th Annual ACM Symposium on Principles of Distributed Computing, pp. 267-276, 1996.

Michael, Maged M., "*Safe Memory Reclamation for Dynamic Lock-Free Objects Using Atomic Reads and Writes*", 21st Annual ACM Symposium on Principles of Distributed Computing, pp. 21-30, Jan. 2002.

Moir, Mark, "*Laziness Pays! Using Lazy Synchronization Mechanisms to Improve Non-Blocking Constructions*", 19th Annual ACM Symposium on Principles of Distributed Computing, 2000.

Moir, Mark, "*Practical Implementations of Non-Blocking Synchronization Primitives*", 16th Annual ACM Symposium on Principles of Distributed Computing, 1997.

Moir, Mark, "*Transparent Support for Wait-Free Transactions*", 11th International Workshop on Distributed Algorithms, 1997.

Moir, Mark et al., " *Wait-Free Algorithms for Fast, Long-Lived Renaming*", Science of Computer Programming, Aug. 1994.

Saks, Michael et al., "*Optimal Time Randomized Consensus—Making Resilient Algorithms Fast in Practice*", 2nd ACM SIAM Symposium on Discrete Algorithms, pp. 351-362, 1991.

Shavit, Nir et al., "*Software Transactional Memory*", Distributed Computing, Special Issue (10), 1997.

Trieber, R, "*Systems Programming: Coping with Parallelism*", IBM Technical Report RJ5118, Apr. 23, 1986.

Turek, John et al., "*Locking without Blocking: Making Lock Based Concurrent Data Structure Algorithms Nonblocking*",11th ACM SIGACT-SIGMOD-SIGART Symposium on Principles of Database Systems, 1992.

Herlihy, M.P., "Wait-Free Synchronization," *ACM Transactions On Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbla.edu/reports/reports-1992/cucs-039-92.ps. gz].

Bershad, B. N., "Practical Considerations For Non-Blocking Concurrent Objects," *Proceedings 13th IEEE International Conference on Distributed Computing Systems*, pp. 264-273. IEEE Computer Society Press, Washington, D.C., 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization And Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Attiya, Hagit, et al., "Atomic Snapshots In O(n log n) Operations," *SIAM Journal on Computing*, 27(2):319-340, Apr. 1998.

* cited by examiner

OBSTRUCTION-FREE MECHANISM FOR ATOMIC UPDATE OF MULTIPLE NON-CONTIGUOUS LOCATIONS IN SHARED MEMORY

CROSS-REFERENCE TO RELATED APPLICATION(S)

This application claims priority, under 35 U.S.C. §119(e), of U.S. Provisional Application No. 60/396,152, filed Jul. 16, 2002, naming Mark Moir, Victor Luchangco and Maurice Herlihy as inventors.

BACKGROUND

1. Field of the Invention

The present invention relates generally to coordination amongst execution sequences in a multiprocessor computer, and more particularly, to structures and techniques for facilitating non blocking implementations of shared data structures.

2. Description of the Related Art

Significant research effort has been applied in recent years to the development nonblocking implementations of shared data structures. Typically, this work is aimed at avoiding the numerous problems associated with the use of mutually exclusive locks when accessing shared data structures. These problems include deadlock, convoying and priority inversion and are generally well known in the art.

By using locks, operations on a shared data structure can prevent concurrent operations from accessing (parts of) the data structure for certain periods of time. In contrast, an operation in a nonblocking implementation of a shared data structure can be interrupted at any moment by another operation, and therefore the implementation must typically keep data consistent in every state, rather than simply ensuring that the data are consistent before releasing a lock. This presents a challenge, because if we want to change multiple parts of the data structure then we must prevent another operation from "seeing" some parts of the updates but not others.

Because current hardware architectures do not typically support an atomic modification of multiple, non-contiguous memory locations, it would be desirable to provide the illusion of this atomicity in software. Unfortunately, achieving this goal has proven difficult, particularly when we consider that nonoverlapping sets of atomic updates should not interfere with each other's performance if there is to be any hope of scalability of applications and data structure implementations that would employ the atomic updates.

SUMMARY

We present a novel technique for implementing obstruction-free atomic multi-target transactions that target special "transactionable" locations in shared memory. The programming interface for using operations based on these transactions can be structured in several ways, including as n-word compare-and-swap (NCAS) operations or as atomic sequences of single-word loads and stores (e.g., as transactional memory).

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
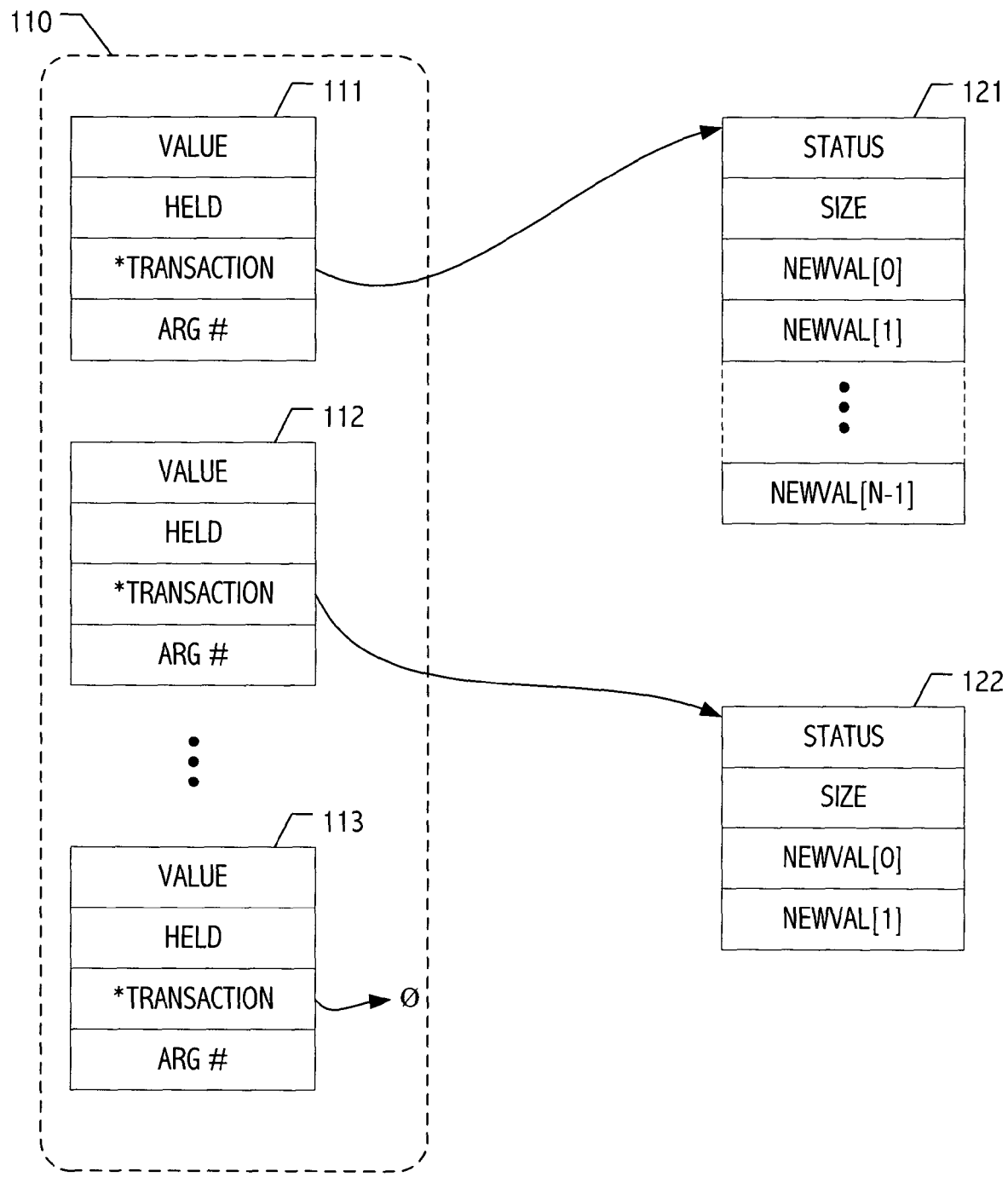
FIG. 1 depicts relationships between encodings of transactionable locations and transaction descriptors in accordance with some embodiments of the present invention.

We have developed a new software-based technique for implementing multi-target atomic operations on an arbitrary number of non-contiguous memory locations using synchronization facilities available on many standard architectures. Such operations can be presented to the programmer in a variety of application programming interfaces (APIs), or simply employed (e.g., ad hoc) without definition of a standardized interface. The software may be encoded in a computer program product or computer readable storage medium, such as a disk, a tape or another magnetic, optical, or electronic storage medium. Since the APIs tend to provide a useful descriptive context for illustrating our techniques, the description that follows assumes an API, though without limitation. One alternative API takes the form of two atomic operations: an atomic n-target compare-and-swap (NCAS) operation and an atomic load operation. The NCAS operation takes a sequence of n addresses, $a_1, \ldots a_n$, a sequence of n old values, $x_1, \ldots x_n$, and a sequence of n new values, $y_1, \ldots y_n$. If the operation returns true, then for each i, $1 \leq n$, the value at location $a_i$ is equal to $x_i$, and the value at $a_i$ is set to $y_i$. If the operation returns false, then no memory location is changed, and the operation returns false. We say a transaction (or NCAS) succeeds if it returns true, and fails if it returns false. The load operation simply takes an address and returns the value at that address.

An alternative API is a transaction: a sequence of single-target loads and stores that appear to take effect atomically with respect to other transactions. The programmer begins a transaction, executes a sequence of single-target loads and stores on behalf of that transaction, and then attempts to commit the transaction. If the commit succeeds, then none of that transaction's loads or stores appear to be interleaved with the loads and stores of other transactions. If the commit fails, then none of that transaction's stores will be visible to other transactions.

The proposed implementation is obstruction-free, meaning that if a thread t executes a transaction (or NCAS) and, at some point, t runs without interruption for long enough, then that transaction (or NCAS) will complete. The load operation is wait-free: it will return a value as long as the calling thread runs long enough (with or without interruption). The proposed implementation is also linearizable, implying that each transaction (or NCAS) appears to take effect instantaneously at some point between its invocation and response. For clarity of description, we focus on the NCAS implementation. Transforming this implementation to the transactional memory API is straightforward, and is discussed below.

Overview

We now describe our basic technique(s) in the context of a multitarget compare and swap (NCAS) operation. Each transactionable location may be "acquired" by an NCAS operation that wants to access it. In this case, we say that the NCAS operation owns the location. At most one NCAS operation may own a location at any time. Thus, concurrent NCAS operations that want to access the same location must compete for ownership of that location. In addition to a value, a transactionable location contains a pointer (or other suitable reference) to its owner, if any.

In an illustrative embodiment, each NCAS operation maintains a data structure called a transaction descriptor.

```
typedef struct trans_s {
    status_t status;
    int size;              // size > 0
    value_t [ ] newvals;   // should have size elements
} trans_t;
```

The size field indicates the number of memory locations affected by the NCAS, and the newvals field is an array of size values that will replace the current values if the NCAS succeeds. The status field of a transaction descriptor indicates whether the current NCAS operation, if any, is on track to succeed.

```
typedef enum {ACTIVE, SUCCESS, FAIL, LOST} status_t;
```

Transactionable locations can be represented as follows:

```
typedef struct loc_s {      // Should be atomically CAS-able
    value_t val;
    bool held;
    trans_t *trans;
    int argno;
} loc_t;
```

The val field encodes the value of the transactionable location (or in some exploitations, a reference to a location that encodes the value of the transactionable location). The held field encodes a Boolean status of the transactionable location. For example, a transactionable location is held if owned by an NCAS operation. The pointer trans identifies the NCAS operation (by transaction descriptor), if any, that owns the transactionable location. Finally, the field argno identifies the particular argument, $0 \leq argno < N$, where N is the size of the owning NCAS operation.

FIG. 1 illustrates relationships between encodings of transaction descriptors and various transactionable locations in accordance with some embodiments of the present inventions. In particular, two active transactions corresponding to transaction descriptors 121 and 122 are illustrated. The first active transaction (see transaction descriptor 121) corresponds to an N-way CAS, while the second active transaction (see transaction descriptor 122) corresponds to a 2-way CAS (or DCAS). The first transaction targets N transactionable locations 110 and owns at least one of the transactionable locations, namely transactionable location 111. One of the transactionable locations targeted by the first transaction, namely transactionable location 112, is owned by the second transaction, which corresponds to transaction descriptor 122. Transactionable location 113 is unowned.

To successfully complete, the first active transaction will need to acquire ownership of transaction location 112 in addition to each of the other transactionable locations it targets. Coordination amongst competing transactions will be understood in light of the description that follows.

Figure 2:
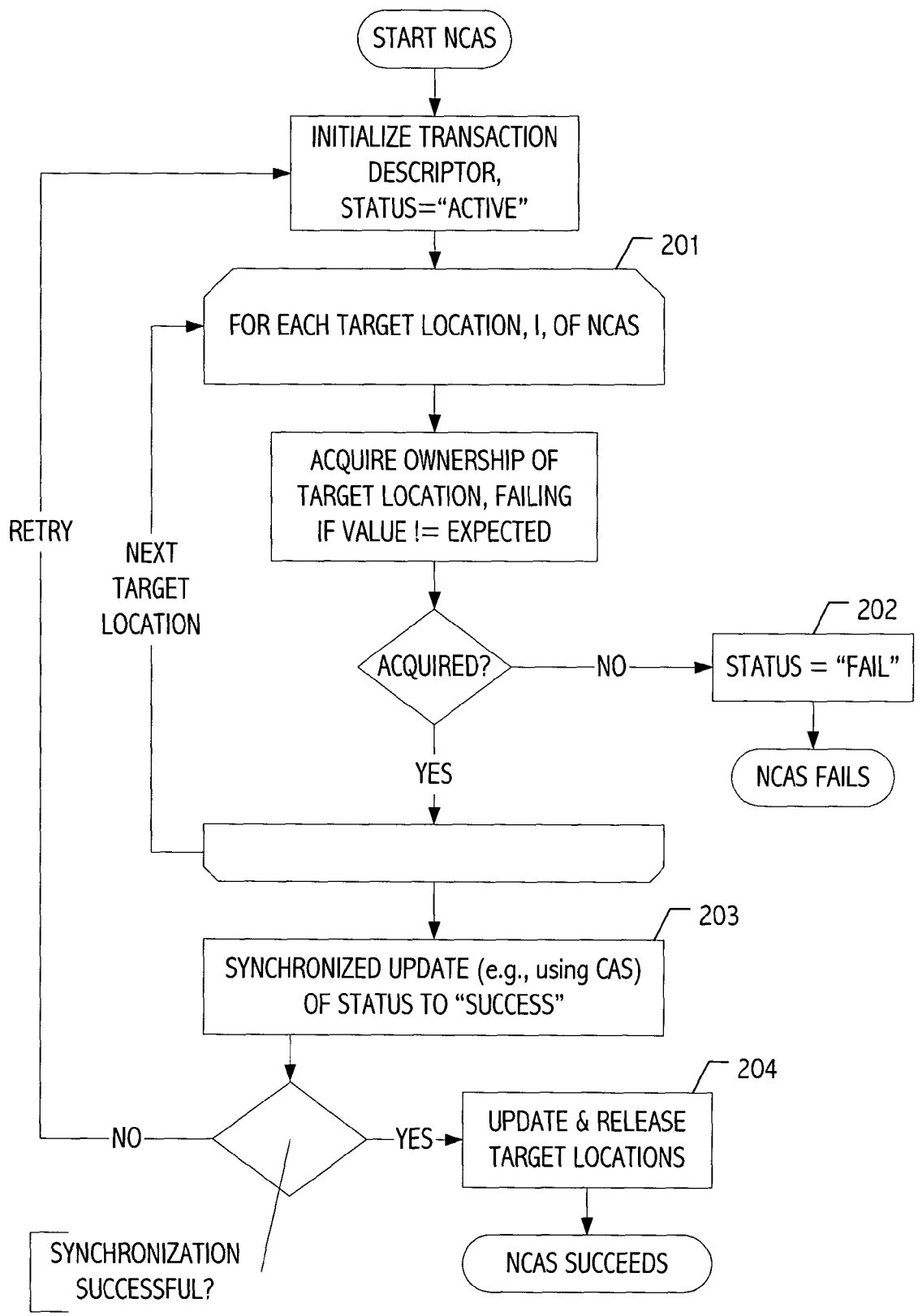
FIG. 2 is a flow diagram that highlights major flows in execution of a multitarget compare and swap (NCAS) operation in accordance with some embodiments of the present invention.

FIG. 2 illustrates major flows in execution of a multitarget compare and swap (NCAS) operation in accordance with some embodiments of the present invention. Initially, the status of a NCAS operation is ACTIVE. An NCAS operation first attempts (loop 201) to acquire all the locations it wishes to update. If it determines that the current value of any of them is not equal to the expected value passed to the NCAS operation, then it fails (202) and returns false. Otherwise, once the NCAS operation has acquired all the specified locations, it attempts to change (203) its status from ACTIVE to SUCCESS. To properly synchronize with a concurrent operation that may be seeking to wrest ownership of a targeted location, the status update employs an appropriate synchronization primitive, e.g., a compare and swap (CAS) operation, a load-linked, store-conditional operation pair, etc. If the transaction succeeds in changing its status, then it writes back the new values and releases (204) the transactionable locations.

The instant at which a transaction's status field is changed to SUCCESS is the serialization point of a successful NCAS operation: the abstract values of all locations owned by that operation are changed atomically from the value stored in the locations to the new values stored in the transaction descriptor of the operation. The abstract value of a location changes only at the serialization point of a successful NCAS operation that targets the location.

Figure 3:
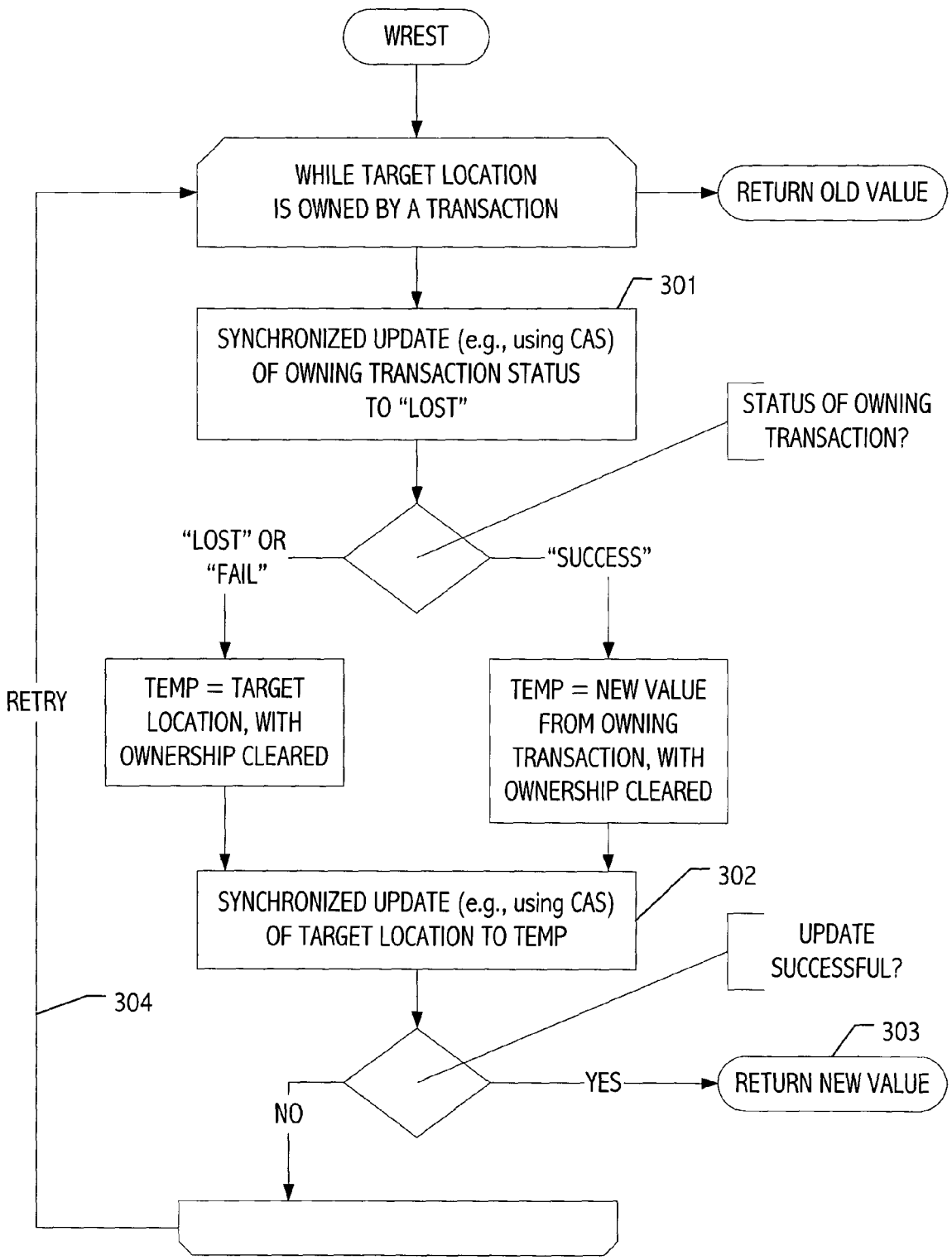
FIG. 3 is a flow diagram that highlights major flows in execution of an illustrative ownership wresting sequence employed by a multi-target compare and swap (NCAS) operation in an attempt to acquire ownership of a target location thereof.

An NCAS operation $c_1$ attempting to acquire a location that is owned by another NCAS operation $c_2$ must "wrest" ownership from $c_2$ in order to continue. FIG. 3 illustrates major flows in execution of an illustrative ownership wresting sequence employed by a multitarget compare and swap (NCAS) operation in an attempt to acquire ownership of a target location thereof. Operation $c_1$ wrests ownership using an appropriate synchronization primitive, e.g., a compare and swap (CAS) operation, a load-linked, store-conditional operation pair, etc., (301) to change the status field of $c_2$ from ACTIVE to LOST. When $c_2$ attempts to complete the operation, it will fail, and must retry.

Assuming the synchronization primitive was successful (or that NCAS operation $c_2$ failed for some other reason), we attempt to update the transactionable location to reflect an unowned status, i.e., held=false. If the synchronization primitive was unsuccessful because the owning transaction was able to complete (updating it's status to SUCCESS), a new value for the transactionable location, which is stored in the owning transaction's descriptor, is used to update the value of the transactionable location. In either case, we attempt to update the transactionable location to reflect an unowned status, i.e., held=false. A synchronization primitive, e.g., a compare and swap (CAS) operation, a load-linked, store-conditional operation pair, etc., (302) is employed to mediate the attempt. If successful, the transactionable location value is returned (303). If not, we retry (304).

Exemplary NCAS Implementation

While the preceding description highlights certain aspects of an exemplary implementation of an NCAS operation, certain flows, conditions, behaviors, etc. are omitted for clarity of description. Accordingly, some of the omitted aspects will be better understood by persons of ordinary skill in the art based on review of the pseudocode that follows. In particular, certain details of ownership acquisition may be better understood with reference to the exemplary code.

The following code is merely illustrative, and based on the description herein persons of ordinary skill in the art will appreciate a wide range of suitable variations. Turning first to an NCAS operation:

```
bool NCAS (int n, (loc_t *) [ ] args, value_t [ ] evs,
                    value_t [ ] nvs) {
    // Assumes n>0, and args [0 . . . n–1], evs [0 . . . n–1] and
    // nvs [0 . . . n–1] are defined. *args [0] . . . *args [n–1] are
    // Tlocs to be accessed (read and modified).
    // evs [i] is the value we "expect" to find in args [i]->val
    // nvs [i] is the value written into args [i]->val if the
    // NCAS succeeds, args, evs and nvs are assumed to be
    // local (not modified by other threads).
    // They are not modified by this operation.
    // Also assumes that args [i] != args [j] if i != j.
    while (true) {
        /* Set up transaction descriptor */
        trans_t *t = new trans_t (n);   // transaction descriptor
                                         // for this NCAS
        t->status = ACTIVE;    // changes only once (to SUCCESS or
                               // LOST)
        t->size = n;   // size and newvals never change
                       // (after init)
        for (int i = 0; i < n; i++)
            t->newvals [i] = nvs [i];   // Can avoid copying (and
                                         // allocating space for
                                         // newvals) if nvs will not
                                         // be recycled prematurely.
        if (!AcquireAll (n, args, evs, t)) {
            t->status = FAIL;
            return false;
        }
        CAS (&t->status, ACTIVE, SUCCESS);
        for (int i = 0; i < n; i++)
            Release (args [i], t);
        if (t->status == SUCCESS)
            return true;
        else                        // t->status == LOST
            t->status = ACTIVE;     // try again
    } // end while (true)
}
```

The locations, *args[0]. *args[n–1], are transactionable locations to be accessed (read and modified) by the NCAS operation. A value evs [i] is the value we "expect" to find in the value field of a corresponding transactionable location, i.e., in args [i]→val, and nvs [i] is the value written into args [i]→val if the NCAS operation succeeds. Storage for the parameters args, evs and nvs is assumed to be local (i.e., not modified by other threads).

The NCAS operation employs a sequence of operations to acquire ownership of all targeted transactionable locations, while also ascertaining that value of each such targeted transactionable locations is as expected. By commingling the ownership acquisition and expected value checks, the illustrated implementation attempts to avoid unnecessary work. Pseudocode for three nested procedures AcquireAll, Acquire and Wrest employed by the NCAS operation follow:

```
bool AcquireAll(int n, (intn, (loc_t *) [ ] args, value_t [ ] evs,
                       trans_t *t) {
    // Assumes n > 0, and args [0 . . . n–1] and evs [0 . . . n–1] are
    // defined. *args [0] . . . *args [n–1] are Tlocs to be accessed
    // (read and modified). evs [i] is the (abstract) value we
    // "expect" to find in *args [i]. args and evs are assumed
    // to be local and are not modified.
    // If AcquireAll returns true, then each *args [i] was
    // <evs [i], true, t, i> at some time during the execution of
    // this procedure. (May be different times for different
    // i's.) If AcquireAll returns false, then for some i, the
    // abstract value of *args [i] is not evs [i] at some time
    // during the execution of this procedure.
    // May "wrest" ownership of *args [i], aborting active NCAS
    // operations.
    for (int i = 0; i < n; i++) {
        if ( !Acquire (args [i], evs [i], t, i) ) {
            for ((int j = 0; j <= i; j++)
                Release (arg [j], t);    // (Optional--helps other
                                          // threads)
            return false;
        }
    }
    return true;
} // end AcquireAll
```

As before, locations *args [0]. . . *args [n–1] are transactionable locations to be accessed (read and modified) by the NCAS operation. Value evs [i] is the (abstract) value we "expect" to find in *args [i]. Storage for args and evs are assumed to be local and are not modified.

If AcquireAll returns true, then each *args [i] had a value<evs [i], true, t, i> at some time during the execution of the procedure. That is, each targeted transactionable location encoded the expected value and was held (i.e., owned) by the current NCAS operation (transaction=t). Of course, the times may be different for different i's. If AcquireAll returns false, then for some i, the abstract value of *args [i] is not evs [i] at some time during the execution of this procedure. AcquireAll invokes Acquire to check expected value and, if appropriate, acquire ownership for an individual transactionable location. Exemplary code for the Acquire procedure follows:

```
bool Acquire ((loc_t *) arg, value_t ev, trans_t *t, int i) {
    // If Acquire returns true, *arg was <ev, true, t, i>
    // at some point during the execution of this procedure.
    // If Acquire returns false, arg->val != ev at some point
    // during the execution of this procedure.
    // May "wrest" ownership of *arg, aborting active NCAS
    // operations.
    loc_t old;
    while ( ( old = *arg) != <ev, true, t, i> )    { // not already
                                                     // acquired
        if (old.held)
            old = Wrest (arg);
        if (old.val != ev)
            return false;
        if CAS (arg, old, <ev, true, t, i>) break;
    }
    return true;
} // end Acquire
```

If a transactionable location to be acquired by the NCAS operation is currently held by another transaction, the Acquire procedure invokes wrest to make the location unowned, aborting (if necessary) an active competing transaction. The following code is exemplary:

```
loc_t Wrest (loc_t *arg) {
    // Makes the location unowned, if it isn't already.
    // Does not change the abstract value of the location.
    // Returns the new contents of *arg.
    loc_t old, newv;
    while ( (old = *arg).held ) {
        if (old.trans->status == ACTIVE) {
            // Opportunity for backoff, in which case we should
```

```
            // reread status
            CAS (&old.trans->status, ACTIVE, LOST);
        }
        if (old.trans->status == SUCCESS)
            newv = <old.trans->newvals [old.argno], false, NULL, 0>;
        else // old.trans->status == LOST or FAIL
            newv = <old.val, false, NULL, 0>;
        if CAS (arg, old, newv)
            return newv;
    }
    return old;
} // end Wrest
```

A Release operation is also employed by the NCAS implementation to perform the appropriate value update and ownership clearing on successful completion of an NCAS operation. In addition, the release facility may be optionally employed even by a failing NCAS operation to clear ownership of acquired transactionable locations. Exemplary code for a Release operation follow:

```
void Release ((loc_t *) arg, trans_t *t) {
// Assumes t->status != ACTIVE
// Sets *arg to <--, false, NULL, 0> if arg->trans == t
// (-- is abstract value)
    if ((old = *arg).trans == t) {
        if (t->status == SUCCESS)
            newv = <t->newvals [old.argno], false, NULL, 0>;
        else
            newv = <old.val, false, NULL, 0>;
        CAS (arg, old, newv)
    }
} // end Release
```

Finally, while we have focused on description of an NCAS operation, persons of ordinary skill in the art will appreciate that applications will typically need to load values from transactionable locations as well. Because the value of a transactionable location may reside in the transactionable location or with an owning transaction, implementation in accordance with the following pseudocode may be employed to obtain the appropriate version.

```
value_t trans_Load ( loc_t *l ) {
    loc_t tloc = *l;
    if (!tloc.held)
        return tloc.val;
    if (tloc.trans->status != SUCCESS)
        return tloc.val;
    return tloc.trans->newvals [tloc.argno];
}
```

The trans_Load operation simply reads the location and, if the location is unowned, returns the value stored there. If the location is owned, then the operation reads the status of the owner. If the owner has successfully completed, then the load returns the value stored in the corresponding entry of the array of new values stored in the owner's transaction descriptor. Otherwise, the trans_Load returns the value it read in the location.

Correctness

To see that the operations are correctly implemented, we show that a trans_Load operation returns a value that was the abstract value of the location at some time during its execution (and does not change the abstract value of the location), that for a successful NCAS operation, there is a time during its execution that the abstract values of all the locations matched the expected values passed into the NCAS operation and were atomically updated to the new values passed into the operation, and that for a failed NCAS operation, some location specified by the operation did not have the expected value at some time during its execution.

To see this, recall that the abstract value of a location is determined by the contents of the location and by the contents of the descriptor of the owning transaction, if any. Specifically, the abstract value of an unowned transactionable location is the value stored in that location. The abstract value of an owned transactionable location depends on the status of the owner: If the owner has not succeeded, the abstract value of the location is still the value stored in that location. If the owner has succeeded, the abstract value is the value stored in the corresponding entry of the array of new values stored in the owner's transaction descriptor.

The key to the correctness argument is that when an NCAS operation changes its status from ACTIVE to SUCCESS— this point is the serialization point of a successful NCAS operation—it still owns all the locations it acquired. This property is guaranteed because an operation that owns a location only loses ownership (without releasing the location) when the location is wrested by another operation. In this case, the other operation must first change the first operation's status to LOST. Thus, the first operation's attempt to change its status from ACTIVE to SUCCESS will fail, and the operation must retry. It is also important to note that, once an operation has succeeded, its status will be SUCCESS thereafter.

A failed NCAS operation is serialized at the point that it reads (inside the Acquire procedure) a location whose value is not the expected value passed into the operation. The value stored in the location is the abstract value of the location because Acquire ensures that the location is unowned before checking its value against the expected value.

A load that finds a location unowned, or finds that the owner has not yet succeeded, is serialized at the point that it read the location. (The owner, if any, had not yet succeeded at this point, if it has not succeeded when the load checks its status.) If the location is owned by an NCAS operation that has succeeded at the time the load operation checks its status, then the load is serialized at the later of the time that it read the location and the time (immediately after) the owner changed its status to SUCCESS. This instant always occurs during the execution of the load operation (after it read the location and before it read the status of the owner), and the value returned is the abstract value at that time because, by the key correctness property above, an NCAS operation that changes its status to SUCCESS owns all the locations it acquired (including the location being loaded) at the time that it updates its status.

The load operation is clearly wait-free, as it has no loops. Informally, it is easy to see that the NCAS operation is obstruction-free because once an operation runs alone, eventually either it will find a location that does not have the expected value, in which case it will fail, or it will wrest all its desired locations from other operations that may own them, find that they all have the expected values, and succeed in changing its status to SUCCESS. Verifying this rigorously is a straightforward task: every while loop completes in at most one full iteration if it is executed in isolation.

Note that two threads attempting to NCAS the same location may indefinitely cause each other to retry, even if they both expect the correct value, which never changes during the execution of their NCAS operations. This can occur only if each wrests the location from the other before the other is able to successfully complete; for this to happen, both threads must take steps. As a practical matter, such conflicts can be avoided by standard means such as exponential back-off or queuing.

Memory Management

The only data structures allocated here are transaction descriptors: each transaction gets a new transaction descriptor. These transaction descriptors can be recycled using non-blocking memory management techniques such as described in commonly owned, co-pending U.S. patent application Ser. No. 10/340,156, filed Jan. 10, 2003, naming Mark S. Moir, Victor Luchangco and Maurice Herlihy as inventors.

Extensions to Larger Transactionable Locations

For convenience, we have thus far presented our techniques assuming that a memory location sufficient to contain a loc_t record can be atomically accessed by load and CAS instructions. If this is not the case, several alternative implementations are possible consistent with the techniques we have described.

For example, we may employ an additional level of indirection so that, rather than using a CAS instruction to modify loc_t records, we instead use a CAS instruction to modify pointers to buffers that are large enough to contain loc_t records. It is safe to reuse one of these buffers only after it has been determined that no thread will subsequently read from the buffer before it is reused. Such determination can be made by standard garbage collectors, or by nonblocking memory management techniques such as those described in commonly owned, co-pending U.S. patent application Ser. No. 10/340,156, filed Jan. 10, 2003 and naming Mark S. Moir, Victor Luchangco and Maurice Herlihy as inventors, the entirety of which in incorporated herein by reference. Given this arrangement, and because the buffers are not modified after they are initialized and before they are reused, we can consider the load of a pointer to a buffer as an atomic load of the contents of that buffer, and our implementation works as described previously.

Another option is to relax the requirement that a location contains the old value of the location while that location is owned by a transaction. This way, at any point in time, each location contains either its value (if the location is not currently owned) or a reference to the owning transaction descriptor. In this case, to facilitate the wresting of ownership by one transaction from another, a transaction that acquires ownership of the location first stores the value that will be displaced by that acquisition somewhere that it can be found by the wresting transaction; a natural place to store the displaced value is in the transaction descriptor. This approach assumes that there is some effective method for distinguishing application values from references to transaction descriptors. This can be achieved for example by "stealing a bit" from application pointers, using well-known techniques for aligned allocation so that the least significant bit of every pointer is zero. Another possibility exists if the application values are known to be pointers returned to the application by a memory allocator. In this case, because the memory allocator will not return to the application a pointer to a transaction descriptor already allocated by the NCAS or transactional memory implementation, we can distinguish application values from references to transaction descriptors by keeping track of the addresses of all transaction descriptors. This can be made efficient by allocating all transaction descriptors in a single block, so that distinguishing them from application values is merely an address range comparison.

In the case that we "displace" application values into transaction descriptors when acquiring ownership, it is more difficult to provide a wait-free load operation because we may have to repeatedly "chase" the displaced value from one transaction to another. However, it is still straightforward to provide an obstruction-free load operation because this chasing will occur only in the presence of contention with concurrent transactions.

Transactional Memory Variations

It is straightforward to convert the illustrated NCAS implementation to a transactional memory implementation. As before, each transaction must acquire a location before loading from that address or storing to it. Instead of keeping a fixed-size newval field in the transaction descriptor, the transaction can keep a table of new values indexed by address. When a location is acquired, the transaction copies the address and its current value into the table. To load from that address, the transaction returns the corresponding value from the table. To store to that address, the transaction modifies the corresponding value from the table. To commit a transaction, the transaction moves the value from the table to the memory location, and resets the held and trans field as before. One transaction wrests a value from another as before.

The principal difference between the transactional memory API and the NCAS API is that the number of locations affected by a transaction need not be declared in advance. Earlier work in the area of software transactional memory required that a transaction predeclare the memory locations it would update in order to ensure that some transaction always made progress. The obstruction-free property, however, does not make such strong guarantees, so the programmer is free to choose memory locations on the fly.

Contention Management Strategies

Despite our advocacy of obstruction-free synchronization, we do not expect progress to take care of itself. On the contrary, we have found that explicit measures are often necessary to avoid starvation. Obstruction-free synchronization encourages a clean distinction between the obstruction-free mechanisms that ensure correctness (such as conflict detection and recovery) and additional mechanisms that ensure progress (such as adaptive backoff or queuing).

In our multitarget transaction implementation, progress is the responsibility of a contention manager, which may be separate from, or modular with respect to the transaction implementation itself Each thread has its own contention manager instance, which it consults to decide whether to force a conflicting thread to abort. In addition, contention managers of different threads may consult one another to compare priorities and other attributes.

The correctness requirement for contention managers is simple and quite weak. Informally, any active transaction that asks sufficiently many times must eventually get permission to abort a conflicting transaction. More precisely, every call to a contention manager method eventually returns (unless the invoking thread stops taking steps for some reason), and every transaction that repeatedly requests to abort another transaction is eventually granted permission to do so. This requirement is needed to preserve obstruction-freedom: A transaction T that is forever denied permission to abort a conflicting transaction will never commit even if it runs by itself. If the conflicting transaction is also continually requesting permission to abort T, and incorrectly being denied this permission, the situation is akin to deadlock. Conversely, if T is eventually allowed to abort any conflicting transaction, then T will eventually commit if it runs by itself for long enough.

The correctness requirement for contention managers does not guarantee progress in the presence of conflicts. Whether a particular contention manager should provide such a guarantee—and under what assumptions and system models it should do so-is a policy decision that may depend on applications, environments, and other factors. The problem of avoiding livelock is thus delegated to the contention manager. The wrest operation, detailed above, illustrates one suitable opportunity for contention management by backoff or other contention management technique.

Other Embodiments

While the invention(s) is(are) described with reference to various embodiments, it will be understood that these embodiments are illustrative and that the scope of the invention(s) is not limited to them. Terms such as always, never, all, none, etc. are used herein to describe sets of consistent states presented by a given computational system, particularly in the context of correctness proofs or discussions. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular multitarget transactions and particular implementations thereof have been described in detail herein, applications to other transactions, multitarget operations and implementations will also be appreciated by persons of ordinary skill in the art. In addition, more complex shared object structures may be defined, which exploit the techniques described herein. Other synchronization primitives may be employed. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method in a computer system, the method comprising:
defining a plurality of transactionable locations, wherein individual ones of the transactionable locations encode respective values and are owned by no more than one transaction at any given point in a multithreaded computation;
for a particular non-blocking multi-target transaction of the multithreaded computation targeting two or more of the plurality of transactionable locations, attempting to acquire ownership of each of the transactionable locations targeted thereby, wherein the ownership acquiring wrests ownership from another non-blocking transaction that owns the targeted transactionable location without the other non-blocking transaction releasing ownership; and
once ownership of each of the targeted transactionable locations has been acquired, attempting to commit the particular non-blocking multi-target transaction using a single-target synchronization primitive to ensure that, at the commit, the particular non-blocking multi-target transaction continues to own each of the targeted transactionable locations, wherein individual ones of the non-blocking multi-target transactions do not contribute to progress of another.

2. The method of claim 1,
wherein the ownership wresting employs a single-target synchronization primitive to change status of the wrested-from transaction to be incompatible with a commit thereof.

3. The method of claim 2,
wherein, as a result of the status change, the wrested-from transaction fails and retries.

4. The method of claim 2,
wherein the wrested-from non-blocking transaction is itself a non-blocking multi-target transaction.

5. The method of claim 1, further comprising:
on failure of the commit attempt, reacquiring ownership of each targeted transactionable location and retrying.

6. The method of claim 1,
wherein no active transaction is able to prevent another transaction from wresting therefrom ownership of transactionable locations targeted by the active transaction.

7. The method of claim 1,
wherein the ownership acquiring employs a single-target synchronization primitive to update the ownership of the targeted transactionable location.

8. The method of claim 1,
wherein each encoding of a transactionable location is atomically updateable using a single-target synchronization primitive.

9. The method of claim 1,
wherein the individual transactionable location encodings further include an identification of the owning transaction's corresponding value for the transactionable location.

10. The method of claim 1, further comprising:
accessing values corresponding to individual ones of the transactionable locations using a wait-free load operation.

11. The method of claim 1,
wherein the transactionable locations directly encode the respective values.

12. The method of claim 1,
wherein the transactionable locations are indirectly referenced.

13. The method of claim 1,
wherein the transactionable locations are encoded in storage managed using a non-blocking memory management technique.

14. The method of claim 1,
wherein the transactionable locations, if unowned, directly encode the respective values and otherwise encode a reference to the owning transaction.

15. The method of claim 1,
wherein the single-target synchronization primitive employs a Compare-And-Swap (CAS) operation.

16. The method of claim 1,
wherein the single-target synchronization primitive employs a Load-Linked (LL) and Store-Conditional (SC) operation pair.

17. The method of claim 1,
wherein the single-target of the single-target synchronization primitive includes at least a value and a transaction identifier encoded integrally therewith.

18. The method of claim 1,
wherein the non-blocking multi-target transaction comprises a multi-target compare and swap (NCAS) operation.

19. The method of claim 1,
embodied in operation of an application programming interface (API) that includes a load operation and a multi-target compare and swap (NCAS) operation.

20. The method of claim 19,
wherein the load operation is wait-free.

21. The method of claim 1,
embodied in operation of an application programming interface (API) that provides transactional memory functionality.

22. A computer-readable storage medium storing program instructions computer-executable to implement:
a plurality of non-blocking, multi-target transactions;
wherein the program instructions comprise:
instances of one or more single-target synchronization primitives executable to attempt to acquire, for a particular non-blocking multi-target transaction, ownership of two or more transactionable locations targeted by the non-blocking multi-target transaction so that ownership is wrested from respective other ones of the non-blocking multi-target transactions that own respective ones of the two or more targeted transactionable locations without the respective other ones of the non-blocking multi-target transactions releasing ownership; and
a particular single-target synchronization primitive executable to ensure that, at commit, the particular non-blocking multi-target transaction continues to own each of the two or more targeted transactionable locations; and
wherein individual ones of the non-blocking multi-target transactions do not contribute to progress of others.

23. The storage medium of claim 22, wherein the program instructions are further executable to implement a concurrent computation, and wherein execution of the concurrent computation invokes the non-blocking multi-target transactions.

24. The storage medium of claim 22,
wherein to wrest ownership, the program instructions are further executable to implement an instance of a single-target synchronization primitive changing status of a wrested-from transaction to be incompatible with a commit thereof.

25. The storage medium of claim 24,
wherein, as a result of the status change, the program instructions are further executable to implement the wrested-from transaction eventually failing and retrying.

26. The storage medium of claim 22,
wherein no active transaction is able to prevent another transaction from wresting therefrom ownership of transactionable locations targeted by the active transaction.

27. The storage medium of claim 22,
wherein the two or more transactionable locations directly encode respective values.

28. The storage medium of claim 22,
wherein the two or more transactionable locations are indirectly referenced.

29. The storage medium of claim 22,
wherein the two or more transactionable locations are encoded in storage managed using a non-blocking memory management technique.

30. The storage medium of claim 22,
wherein the two or more transactionable locations, if unowned, directly encode respective values and otherwise encode a reference to an owning transaction.

31. The storage medium of claim 22,
wherein at least some instances of the one or more single-target synchronization primitives employ a Compare-And-Swap (CAS) operation.

32. The storage medium of claim 22,
wherein at least some instances of the one or more single-target synchronization primitives employ a Load-Linked (LL) and Store-Conditional (SC) operation pair.

33. The storage medium of claim 22,
wherein at least some of the non-blocking multi-target transactions comprise a multi-target compare and swap (NCAS) operation.

34. The storage medium of claim 22,
wherein the program instructions comprise operations concurrently executable by one or more processors to operate on state of the two or more transactionable locations.

35. The storage medium of claim 22,
wherein at least some of the non-blocking multi-target transactions are defined by an application programming interface (API) that includes a load operation and a multi-target compare and swap (NCAS) operation.

36. The storage medium of claim 22,
wherein at least some of the non-blocking multi-target transactions are defined by an application programming interface (API) that provides transactional memory functionality.

37. The storage medium of claim 22,
wherein the non-blocking multi-target transactions are obstruction-free, though not wait-free or lock-free.

38. The storage medium of claim 22,
wherein the program instructions do not guarantee that at least one interfering concurrently executed non-blocking multi-target transactions makes progress.

39. The storage medium of claim 22,
wherein the program instructions are further executable to implement a contention management facility configured to facilitate progress in a concurrent computation.

40. The storage medium of claim 39,
wherein execution of the contention management facility ensures progress of the concurrent computation.

41. The storage medium of claim 39,
wherein the contention management facility is modular such that employing alternative contention management strategies does not affect correctness.

42. The storage medium of claim 39,
wherein the contention management facility allows changes in contention management strategy during a course of the concurrent computation.

43. A computer readable storage medium storing program instructions computer-executable to implement:
instantiation of two or more transactionable locations in shared memory configured to individually encapsulate values that are targeted by concurrent executions of non-blocking multi-target transactions; and
one or more instances of a non-blocking multi-target transaction that upon execution of a particular instance thereof, attempts to acquire ownership of each of a plurality of transactionable locations targeted thereby and, once ownership of each of the plurality of targeted transactionable locations has been acquired, attempts to commit the particular instance using a single-target synchronization primitive to ensure that, at the commit, the particular instance continues to own each of the plurality of targeted transactionable locations;

wherein the ownership acquiring wrests ownership from another transaction that owns one of the plurality of targeted transactionable locations without the other transaction releasing ownership; and wherein execution of no one of the non-blocking multi-target transaction instances contributes to progress of another.

44. The storage medium of claim 43, wherein the another transaction is another concurrently executing instance of the non-blocking multi-target transaction.

45. The storage medium of claim 43, wherein at least some instances of the single-target synchronization primitive employ a Compare-And-Swap (CAS) operation.

46. The storage medium of claim 43, wherein at least some instances of the single-target synchronization primitive employ a Load-Linked (LL) and Store-Conditional (SC) operation pair.

47. The storage medium of claim 43, wherein the single-target of the single-target synchronization primitive includes a value and an owning transaction identifier encoded integrally therewith.

48. The storage medium of claim 43, wherein the program instructions are embodied as an application programming interface software component combinable with application program code to facilitate execution of the application program code as a multi-threaded computation.

49. The storage medium of claim 43, wherein the non-blocking multi-target transaction implements a multi-target compare and swap operation (NCAS).

50. The storage medium of claim 43, wherein the non-blocking multi-target transaction implements transactional memory functionality.

51. The storage medium of claim 43, wherein the computer readable storage medium includes at least one medium selected from the set of a disk, a tape and another magnetic, optical, or electronic storage medium.

52. An apparatus, comprising:

one or more processors;

one or more data stores addressable by each of the one or more processors; and means for coordinating concurrent non-blocking execution, by the one or more processors, of non-blocking multi-target transactions that attempt to acquire ownership of each of a plurality of transactionable locations targeted thereby and, once ownership of each of the plurality of targeted transactionable locations has been acquired, attempt to commit a particular instance thereof using a single-target synchronization primitive to ensure that, at the commit, the particular instance continues to own each of the plurality of targeted transactionable locations, wherein the ownership acquiring wrests ownership from another transaction that owns one of the plurality of targeted transactionable locations without the other transaction releasing ownership, and wherein none of the non-blocking multi-target transaction contributes to progress of another.

53. The apparatus of claim 52, wherein the wresting means includes means for ensuring that status of the wrested-from transaction is incompatible with a successful commit thereof.

54. The apparatus of claim 52, further comprising:

means for managing contention between interfering executions of the non-blocking multi-target transactions.

\* \* \* \* \*